US012749636B2

(12) United States Patent
Rana et al.

(10) Patent No.: US 12,749,636 B2
(45) Date of Patent: Sep. 29, 2026

(54) SWITCH MODULE FOR VEHICLE AND VEHICLE INCLUDING THE SWITCH MODULE

(71) Applicants: UNO Minda Limited, Gurgaon (IN); Harley-Davidson Motor Company, Inc., Milwaukee, WI (US)

(72) Inventors: Surender Rana, Gurgaon (IN); Kumar Desh Deepak, Gurgaon (IN); Rahul Sahni, Gurgaon (IN); Shwetaank Sharma, Gurgaon (IN); Benjamin Hynes, Milwaukee, WI (US); Cindy Miller, Milwaukee, WI (US); Shannon Roth, Milwaukee, WI (US); Patrick Mckeon, Milwaukee, WI (US)

(73) Assignees: UNO Minda Limited, Gurgaon (IN); Harley-Davidson Motor Company, Inc.

( * ) Notice: Subject to any disclaimer, the term of this patent is extended or adjusted under 35 U.S.C. 154(b) by 434 days.

(21) Appl. No.: 18/559,631

(22) PCT Filed: May 6, 2022

(86) PCT No.: PCT/IN2022/050437

§ 371 (c)(1),
(2) Date: Nov. 8, 2023

(87) PCT Pub. No.: WO2022/239021

PCT Pub. Date: Nov. 17, 2022

(65) Prior Publication Data

US 2024/0274383 A1 Aug. 15, 2024

(30) Foreign Application Priority Data

May 8, 2021 (IN) ............................ 202111020926

(51) Int. Cl.
*H01H 25/06* (2006.01)
*B60R 16/02* (2006.01)
*H01H 9/06* (2006.01)

(52) U.S. Cl.
CPC .......... *H01H 25/065* (2013.01); *B60R 16/02* (2013.01); *H01H 2009/068* (2013.01)

(58) Field of Classification Search
CPC . H01H 25/065; H01H 2009/068; B60R 16/02
See application file for complete search history.

(56) References Cited

U.S. PATENT DOCUMENTS

2010/0188192 A1* 7/2010 Lumley .................. B60R 25/10 340/5.64
2011/0025488 A1* 2/2011 Leon ..................... B60K 35/10 340/456

(Continued)

FOREIGN PATENT DOCUMENTS

CA 2227201 A1 * 8/1998 .......... B60R 25/021
DE 102017009122 A1 * 3/2018 .......... B60Q 1/0076

(Continued)

OTHER PUBLICATIONS

International Search Report and Written Opinion of the International Searching Authority (ISR-WO) corresponding to counterpart International Patent Application PCT/IN2022/050437 mailed Aug. 25, 2022.

*Primary Examiner* — Drew J Brown
(74) *Attorney, Agent, or Firm* — Renner, Otto, Boisselle & Sklar, LLP

(57) ABSTRACT

A switch module comprising a switch carrier, and an engine stop knob configured to rotate the switch carrier and to be rotated between a neutral position and an active engine stop position, wherein when the engine stop knob is rotated to the neutral position, the engine stop knob rotates the switch carrier to disengage from first microswitches to allow trans- (Continued)

mission of current to an engine of the vehicle, and when the engine stop knob is rotated to the active engine stop position, the engine stop knob rotates the switch carrier to engage with the first microswitches to prevent transmission of current to the engine. The switch module further comprises an engine start knob actuatable to engage with a second microswitch in the neutral position of the engine stop knob to start power generation process of the engine.

16 Claims, 9 Drawing Sheets

(56) References Cited

U.S. PATENT DOCUMENTS

| | | | |
|---|---|---|---|
| 2011/0278139 | A1 | 11/2011 | Windeler |
| 2016/0293360 | A1 | 10/2016 | Osanai et al. |

FOREIGN PATENT DOCUMENTS

| | | | | | |
|---|---|---|---|---|---|
| EP | 2140984 | A2 | * | 1/2010 | ........... H01H 25/065 |
| EP | 3254916 | A1 | | 12/2017 | |
| EP | 3313698 | B1 | | 5/2020 | |
| IN | 441/DEL/2013 | | * | 6/2015 | |
| IN | 441/DEL/2013 | A | | 6/2015 | |
| SE | 1550875 | A1 | * | 12/2016 | ............. B60K 35/10 |
| WO | WO-2022009732 | A1 | * | 1/2022 | ............... G05G 1/04 |

* cited by examiner

SWITCH MODULE FOR VEHICLE AND VEHICLE INCLUDING THE SWITCH MODULE

This application is a national phase of International Patent Application No. PCT/IN2022/050437, filed May 6, 2022, which claims priority to Indian Patent Application number 202111020926, filed May 8, 2021, each of which is incorporated herein by reference in its entirety.

TECHNICAL FIELD

The present disclosure relates to the field of vehicles. Particularly, but not exclusively, the present disclosure relates to a switch module for engine stop and start operations for vehicles.

BACKGROUND

The information in this section merely provides background information related to the present disclosure and may not constitute prior art(s) for the present disclosure.

Engine kill/stop switches are well known in the field of two-wheeled vehicles and are configured to disconnect power supply to an engine of a vehicle and stop power generation process of the engine. An engine stop switch is generally provided on a handlebar of a vehicle. A position of the engine stop switch on the handlebar is determined such that the engine stop switch remains in close proximity of a hand of the driver. Another essential feature for operation of vehicles is an engine start switch (also known as self-start switch) configured to start the power generation process of the engine. The engine start switch is also positioned on the handlebar of the vehicle. The vehicle manufacturers and drivers found that the presence of two distinct switches at two different positions deteriorates the aesthetics of the vehicle. Also, positioning the two switches at two distinct locations at the handlebar takes more space as well as increases the manufacturing cost of the vehicle.

Of late, integrated engine stop switch and start switch modules have been developed for ease of operations of the driver and for the vehicles to look more aesthetically appealing. Such integrated modules have been known to be either made of rotary type arrangements or rocker type arrangements of the engine stop switch and the engine start switch. However, it has been found that such integrated engine stop switch and start switch modules require high ampere current for operation. Also, in rotary type integrated engine stop switch and start switch modules, the operations of stopping and starting the power generation process of the engine is performed by a common rotary knob. In particular, a first angular displacement of the common rotary knob sets the integrated module from an activated engine stop position to a neutral position, and a further angular displacement of the common rotary knob sets the integrated module from the neutral position to an engine start position for starting the engine operation, thereby starting the power generation process of the engine. Accordingly, an operational angle of the common rotary knob is large and therefore, a large angular displacement of the common rotary knob is required to start the power generation process of the engine.

Further, since the common rotary knob is operated to set the integrated module from the activated engine stop position to the neutral position, and further to the engine start position for starting the engine operation, there exists significant chances of accidently and inattentively starting the engine operation by the driver due to direct rotation of the common rotary knob from the activated engine stop position to the engine start position, thereby leading to fatal accidents.

Therefore, there remains a need for an improved rotary type integrated module for engine stop operation and engine start operation that is adapted to overcome at least the problems identified above, and that is capable of being operable at low ampere current, at smaller angular displacement of the rotary knob, and ensures driver and/or passenger safety.

SUMMARY

The one or more shortcomings of the prior art are overcome by the system/assembly as claimed, and additional advantages are provided through the provision of the system/assembly as claimed in the present disclosure. Additional features and advantages are realized through the techniques of the present disclosure. Other embodiments and aspects of the disclosure are described in detail herein and are considered a part of the claimed disclosure.

According to an aspect of the present disclosure, in an embodiment, a switch module for controlling operations of an engine of a vehicle, is disclosed. The switch module comprises a switch carrier, a plurality of microswitches, an engine stop knob, and an engine start knob. The switch carrier is disposed within a housing of the switch module, and the switch carrier is adapted to rotate within the housing. The plurality of microswitches is disposed within the housing, and the plurality of microswitches comprises first microswitches and a second microswitch. Further, the engine stop knob is disposed at a first end of the housing and is operatively coupled to the switch carrier to rotate the switch carrier within the housing. The engine stop knob is configured to be rotated between a neutral position and an active engine stop position. When the engine stop knob is rotated from the active engine stop position to the neutral position, the engine stop knob rotates the switch carrier to disengage from the first microswitches to facilitate closing an electric current circuit for allowing a transmission of current from a power source to the engine of the vehicle, and when the engine stop knob is rotated from the neutral position to the active engine stop position, the engine stop knob rotates the switch carrier to engage with the first microswitches to facilitate opening the electric current circuit for preventing the transmission of current from the power source to the engine of the vehicle. Furthermore, the engine start knob is disposed at the first end of the housing and is operatively coupled with the second microswitch. The engine start knob is actuatable to engage with the second microswitch in the neutral position of the engine stop knob to start power generation process of the engine.

In another non-limiting embodiment of the present disclosure, the switch module comprises a biasing member disposed between the engine start knob and the switch carrier. The biasing member is configured to bias the engine start knob away from the switch carrier and facilitate actuation of the engine start knob.

In another non-limiting embodiment of the present disclosure, the switch carrier comprises a carrier stem formed at a periphery of a hole defined in a plate of the switch carrier. The switch carrier defines grooves formed along a length of the carrier stem.

In another non-limiting embodiment of the present disclosure, the engine start knob comprises a hollow cylinder having a top wall, and a protrusion extending from the top wall. The protrusion has ribs extending radially therefrom, and the ribs of the engine start knob are adapted to be received in the grooves of the switch carrier to engage the engine start knob with the second microswitch in the neutral position of the engine stop knob to start power generation process of the engine.

In another non-limiting embodiment of the present disclosure, the ribs of the engine start knob are offset from the grooves of the switch carrier in the active engine stop position.

In another non-limiting embodiment of the present disclosure, the engine stop knob comprises legs extending from a body of the engine stop knob. The switch carrier defines mounting holes in a plate of the switch carrier. The legs of the engine stop knob are configured to be received in the mounting holes of the switch carrier to facilitate coupling of the engine stop knob with the switch carrier and rotating the switch carrier along with a rotational movement of the engine stop knob between the neutral position and the active engine stop position.

In another non-limiting embodiment of the present disclosure, the housing defines elliptical holes in a housing bracket disposed at the first end of the housing. The elliptical holes are configured to receive the legs of the engine stop knob to facilitate coupling of the engine stop knob with the switch carrier. The elliptical holes are further adapted to provide clearance around the legs of the engine stop knob to rotate between the neutral position and the active engine stop position.

In another non-limiting embodiment of the present disclosure, the switch module comprises at least one rolling unit disposed between the switch carrier and a housing bracket of the housing. Each of the at least one rolling unit is configured to roll and/or slide over a corresponding detent profile defined on a surface of the housing bracket to facilitate rotation the switch carrier along with a rotational movement of the engine stop knob between the neutral position and the active engine stop position.

In another non-limiting embodiment of the present disclosure, each of the at least one rolling unit comprises a rolling ball disposed within a hole defined in a circumferential side of the switch carrier, and a compression spring disposed within the hole of the switch carrier and configured to bias the rolling ball against the detent profile of the housing bracket.

In another non-limiting embodiment of the present disclosure, the switch module comprises a first rolling unit and a second rolling unit. An axis of the rolling ball and the compression spring of the first rolling unit is offset from an axis of the rolling ball and the compression spring of the second rolling unit.

In another non-limiting embodiment of the present disclosure, the axis of the first rolling unit and the axis of the second rolling unit are offset from a longitudinal axis of the switch module.

In another non-limiting embodiment of the present disclosure, each of the axis of the first rolling unit and the axis of the second rolling unit is spaced apart from the longitudinal axis of the switch module by 0.5 mm.

In another non-limiting embodiment of the present disclosure, the detent profile of the housing bracket is comprised of a semi-circular detent arc and two linear detents extending from each end of the semi-circular detent arc.

In another non-limiting embodiment of the present disclosure, the switch carrier comprises actuating clips formed on an abutment shoulder of the switch carrier. The abutment shoulder and the actuating clips are adapted to rotate with the switch carrier to engage or disengage the switch carrier from the first microswitches.

In another non-limiting embodiment of the present disclosure, the housing comprise a housing bracket disposed at the first end of the housing. The housing bracket includes a bracket stem and a plurality of tabs extending from a surface of the housing bracket for mounting the engine start knob and the engine stop knob on the housing.

In another non-limiting embodiment of the present disclosure, the engine stop knob is comprised of an annular disc coupled with the housing and operatively coupled to the switch carrier to rotate the switch carrier within the housing. Further, the engine start knob is a push-button disposed within a central hole of the annular disc of the engine stop knob and actuatable to engage with the second microswitch in the neutral position of the engine stop knob to start power generation process of the engine.

In another non-limiting embodiment of the present disclosure, the plurality of microswitches is electrically coupled with an engine control unit (ECU) of the vehicle and is configured to transmit signals to the engine control unit upon actuation of the microswitches.

According to another aspect of the present disclosure, in an embodiment, a vehicle is disclosed. The vehicle comprises a vehicle frame, a front wheel and a rear wheel, an engine unit and a transmission unit, a steering assembly operatively coupled with the front wheel, and a switch module as recited above, wherein the switch module is adapted to be coupled with a handlebar of the steering assembly and configured to control operations of the engine unit of the vehicle.

Within the scope of the present disclosure, the present disclosure relates to an integrated switch module for engine stop and start operations of vehicles. The switch module may be implemented in all type of vehicles, preferably two-wheelers, to facilitate easy stopping and starting of an engine of the vehicle. The switch module comprises an arrangement of an engine stop knob and an engine start knob operably coupled with the housing bracket and cover elements, carrier element, and microswitches of the switch module for stopping and starting operations and power generation processes of the engine. The engine start knob is arranged with the engine stop knob in such a manner that a "push button" type engine start knob is disposed within an annular "rotary type" engine stop knob. Each of the push button type engine start knob and the rotary type engine stop knob is manoeuvrable to actuate one or more micro switches (or any kind of low/high amperage contact making/breaking mechanism) electrically coupled with an engine control unit (ECU) of the vehicle for starting and stopping the engine operations, respectively.

In accordance with the present disclosure, the engine start knob and the engine stop knob are two separate components of the switch module, and accordingly, a rotation of the engine stop knob facilitates only setting the engine stop knob from an active engine stop position to a neutral position. Therefore, an angular displacement of the engine stop knob of the switch module of the present disclosure is less than an angular displacement of the rotary engine stop knob of the conventional modules. Also, since the engine stop knob of the switch module of the present disclosure is manoeuvrable in a rotational manner, while the engine start knob is manoeuvrable in a push manner, chances of accidently and inattentively starting the engine operations are significantly less as compared to the conventional switch modules.

Further, since the switch module of the present disclosure employs separate engine stop knob and engine start knob, each of which is operably coupled to their respective low ampere microswitches, the operations of stopping and starting the engine are performed at low ampere current.

It is to be understood that the aspects and embodiments of the disclosure described above may be used in any combination with each other. Several of the aspects and embodiments may be combined together to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF FIGURES

The novel features and characteristics of the disclosure are set forth in the description. The disclosure itself, however, as well as a preferred mode of use, further objectives, and advantages thereof, will best be understood by reference to the following description of an illustrative embodiment when read in conjunction with the accompanying drawings. One or more embodiments are now described, by way of example only, with reference to the accompanying drawings wherein like reference numerals represent like elements and in which.

Figure 1:
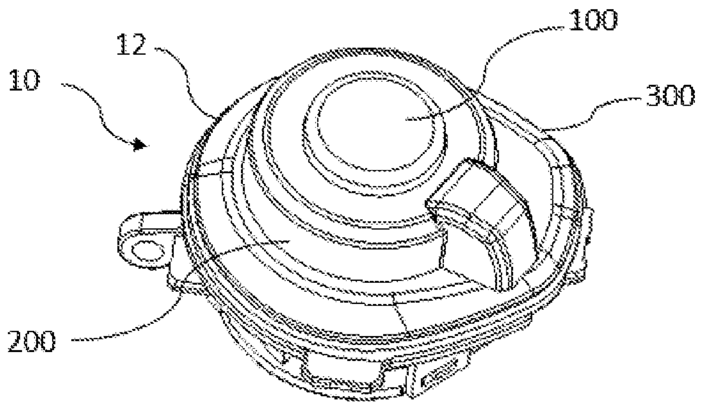
FIG. 1 illustrates a perspective view of a switch module for engine stop operation and engine start operation, in accordance with an embodiment of the present disclosure.

Skilled artisans will appreciate that elements in the drawings are illustrated for simplicity and have not necessarily been drawn to scale. For example, the dimensions of some of the elements in the drawings may be exaggerated relative to other elements to help to improve understanding of embodiments of the present disclosure.

DETAILED DESCRIPTION

While the disclosure is susceptible to various modifications and alternative forms, specific embodiments thereof have been shown by way of example in the FIGS. 1 to 16 and will be described in detail below. It should be understood, however that it is not intended to limit the disclosure to the particular forms disclosed, but on the contrary, the disclosure is to cover all modifications, equivalents, and alternatives falling within the scope of the disclosure as defined by the appended claims.

Before describing detailed embodiments, it may be observed that the novelty and inventive step that are in accordance with the present disclosure resides in a switch module and a vehicle including the switch module. It is to be noted that a person skilled in the art can be motivated from the present disclosure and modify the various constructions of the switch module and the vehicle. However, such modification should be construed within the scope of the present disclosure. Accordingly, the drawings are showing only those specific details that are pertinent to understanding the embodiments of the present disclosure so as not to obscure the disclosure with details that will be readily apparent to those of ordinary skill in the art having benefit of the description herein.

In the present disclosure, the term “exemplary” is used herein to mean “serving as an example, instance, or illustration.” Any embodiment or implementation of the present subject matter described herein as “exemplary” is not necessarily to be construed as preferred or advantageous over other embodiments.

The terms “comprises”, “comprising”, or any other variations thereof, are intended to cover a non-exclusive inclusions, such that a device that comprises a list of components does not include only those components but may include other components not expressly listed or inherent to such setup or device. In other words, one or more elements in a system or apparatus proceeded by “comprises . . . a” does not, without more constraints, preclude the existence of other elements or additional elements in the system or apparatus.

The terms like "at least one" and "one or more" may be used interchangeably or in combination throughout the description.

While the present disclosure is illustrated in the context of a vehicle, however, the switch module and aspects and features thereof can be used with other type of vehicles as well. The terms "modular vehicle", "vehicle", "two-wheeled vehicle", "electric vehicle", "EV" and "motorcycle" have been interchangeably used throughout the description. The term "vehicle" comprises vehicles such as motorcycles, scooters, bicycles, mopeds, scooter type vehicle, and the like.

The terms "front/forward", "rear/rearward/back/backward", "up/upper/top", "down/lower/lower ward/downward, bottom", "left/leftward", "right/rightward" used therein represents the directions as seen from a vehicle driver sitting astride.

In an aspect of the present disclosure, a switch module for controlling operations of an engine of a vehicle, is disclosed. The switch module comprises a switch carrier, a plurality of microswitches, an engine stop knob, and an engine start knob. The switch carrier is disposed within a housing of the switch module, and the switch carrier is adapted to rotate within the housing. The plurality of microswitches is disposed within the housing, and the plurality of microswitches comprises first microswitches and a second microswitch. Further, the engine stop knob is disposed at a first end of the housing and is operatively coupled to the switch carrier to rotate the switch carrier within the housing. The engine stop knob is configured to be rotated between a neutral position and an active engine stop position. When the engine stop knob is rotated from the active engine stop position to the neutral position, the engine stop knob rotates the switch carrier to disengage from the first microswitches to facilitate closing an electric current circuit for allowing a transmission of current from a power source to the engine of the vehicle, and when the engine stop knob is rotated from the neutral position to the active engine stop position, the engine stop knob rotates the switch carrier to engage with the first microswitches to facilitate opening the electric current circuit for preventing the transmission of current from the power source to the engine of the vehicle. Furthermore, the engine start knob is disposed at the first end of the housing and is operatively coupled with the second microswitch. The engine start knob is actuatable to engage with the second microswitch in the neutral position of the engine stop knob to start power generation process of the engine.

In an embodiment, the switch module comprises a biasing member disposed between the engine start knob and the switch carrier. The biasing member is configured to bias the engine start knob away from the switch carrier and facilitate actuation of the engine start knob.

In an embodiment, the switch carrier comprises a carrier stem formed at a periphery of a hole defined in a plate of the switch carrier. The switch carrier defines grooves formed along a length of the carrier stem. In a further embodiment, the engine start knob comprises a hollow cylinder having a top wall, and a protrusion extending from the top wall. The protrusion has ribs extending radially therefrom, and the ribs of the engine start knob are adapted to be received in the grooves of the switch carrier to engage the engine start knob with the second microswitch in the neutral position of the engine stop knob to start power generation process of the engine. Further, the ribs of the engine start knob are offset from the grooves of the switch carrier in the active engine stop position.

In some embodiments, the engine stop knob comprises legs extending from a body of the engine stop knob. The switch carrier defines mounting holes in a plate of the switch carrier. The legs of the engine stop knob are configured to be received in the mounting holes of the switch carrier to facilitate coupling of the engine stop knob with the switch carrier and rotating the switch carrier along with a rotational movement of the engine stop knob between the neutral position and the active engine stop position. Further, the housing defines elliptical holes in a housing bracket disposed at the first end of the housing. The elliptical holes are configured to receive the legs of the engine stop knob to facilitate coupling of the engine stop knob with the switch carrier. The elliptical holes are further adapted to provide clearance around the legs of the engine stop knob to rotate between the neutral position and the active engine stop position.

In yet further embodiments, the switch module comprises at least one rolling unit disposed between the switch carrier and a housing bracket of the housing. Each of the at least one rolling unit is configured to roll and/or slide over a corresponding detent profile defined on a surface of the housing bracket to facilitate rotation the switch carrier along with a rotational movement of the engine stop knob between the neutral position and the active engine stop position. Each of the at least one rolling unit comprises a rolling ball disposed within a hole defined in a circumferential side of the switch carrier, and a compression spring disposed within the hole of the switch carrier and configured to bias the rolling ball against the detent profile of the housing bracket. Also, the switch module comprises a first rolling unit and a second rolling unit. An axis of the rolling ball and the compression spring of the first rolling unit is offset from an axis of the rolling ball and the compression spring of the second rolling unit. Moreover, the axis of the first rolling unit and the axis of the second rolling unit are offset from a longitudinal axis of the switch module. Further, each of the axis of the first rolling unit and the axis of the second rolling unit is spaced apart from the longitudinal axis of the switch module by 0.5 mm. The detent profile of the housing bracket is comprised of a semi-circular detent arc and two linear detents extending from each end of the semi-circular detent arc.

In an embodiment, the switch carrier comprises actuating clips formed on an abutment shoulder of the switch carrier. The abutment shoulder and the actuating clips are adapted to rotate with the switch carrier to engage or disengage the switch carrier from the first microswitches. Further, the housing comprise a housing bracket disposed at the first end of the housing. The housing bracket includes a bracket stem and a plurality of tabs extending from a surface of the housing bracket for mounting the engine start knob and the engine stop knob on the housing. The engine stop knob is comprised of an annular disc coupled with the housing and operatively coupled to the switch carrier to rotate the switch carrier within the housing. Further, the engine start knob is a push-button disposed within a central hole of the annular disc of the engine stop knob and actuatable to engage with the second microswitch in the neutral position of the engine stop knob to start power generation process of the engine. Also, the plurality of microswitches is electrically coupled with an engine control unit (ECU) of the vehicle and is configured to transmit signals to the engine control unit upon actuation of the microswitches.

In another aspect, a vehicle is disclosed. The vehicle comprises a vehicle frame, a front wheel and a rear wheel, an engine unit and a transmission unit, a steering assembly operatively coupled with the front wheel, and a switch module as recited above, wherein the switch module is adapted to be coupled with a handlebar of the steering assembly and configured to control operations of the engine unit of the vehicle.

Reference will now be made to the exemplary embodiments of the disclosure, as illustrated in the accompanying drawings. Wherever possible, same numerals will be used to refer to the same or like parts. Embodiments of the disclosure are described in the following paragraphs with reference to FIGS. 1 to 16. In FIGS. 1 to 16, the same element or elements which have same functions are indicated by the same reference signs.

The present disclosure relates to a vehicle (not shown), for example, a two-wheeled vehicle, such as a motorcycle, etc., according to an embodiment of the invention. The vehicle may comprise a vehicle body frame, a pair of front forks, a front fender, a rear fender, a front wheel, a steering assembly comprising a handlebar, a fuel tank provided below a seat of the vehicle, an engine unit or a power unit, an exhaust system, an engine cooling fan unit, a side body cover, a front cover, a lower front cover, a tail light, a headlight, a foot board, a rear suspension, and a rear wheel. The vehicle body frame may comprise a pair of seat sub-frames for mounting the seat. The vehicle may further comprise a head tube steerably connected to the front forks and the front wheel may be attached to a lower end of the front forks. The handlebar may be attached to an upper end of the head tube. The head light may be arranged in front of the handlebar. The front fender may be provided so as to cover an upper portion of the front wheel. The seat on which a rider straddles is supported by the seat sub frames. The leg shield that protects legs of the rider is provided on the front side. The tail light and the rear fender are provided at a rear portion of the vehicle body frame. The engine unit may be arranged under the seat of the vehicle. The vehicle may further comprise a brake system for applying brake to the front wheel and/or the rear wheel of the vehicle, and for controlling operations of the vehicle.

In accordance with the present disclosure, a switch module (10) for the vehicle is disclosed. The switch module (10) is configured to control operations of the engine of the vehicle, for example, to control engine stop operation and engine start operation of the vehicle. The switch module (10) is adapted to be mounted to the handlebar of the vehicle. Within the scope of the present disclosure, the switch module (10) may be mounted to either the left side or the right side of the handlebar of the vehicle. In a preferred embodiment of the present disclosure, the switch module (10) is mounted to the right side of the handlebar of the vehicle. Alternatively, the switch module (10) of the present disclosure may be mounted to the left side of the handlebar of the vehicle. The handlebar of the vehicle may comprise a "box-like" casing unit for housing the switch module (10) and one or more modules or switches of the vehicle and their corresponding circuitry. In an embodiment, the casing unit includes an upper case and a lower case removably connected to each other by means of fasteners, like screws. Alternatively, the upper case and the lower case of the casing unit may include complimentary abutment surfaces and tabs to couple with each other by means of push-fitting, snap-fitting or the like. A cut-out may be defined in the upper case of the casing unit such that when the switch module (10) is positioned in the casing unit, the switch module (10) is accessible to the driver through the cut-out. The casing unit and the cut-out defined therein are ergonomically designed such that the switch module (10) positioned in the casing unit is easily accessible by a thumb and/or any other finger of the driver, while holding the handlebar of the vehicle.

Figure 1A:
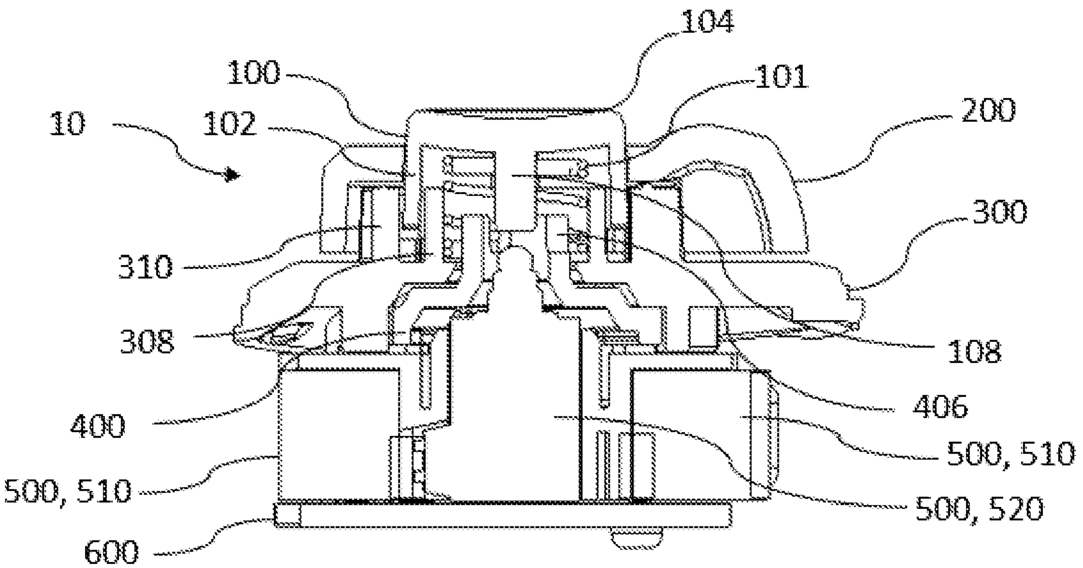
FIG. 1A illustrates a cross-sectional view of the switch module of FIG. 1, taken along a vertical plane passing through a centre of the switch module, in accordance with an embodiment of the present disclosure.
Figure 2:
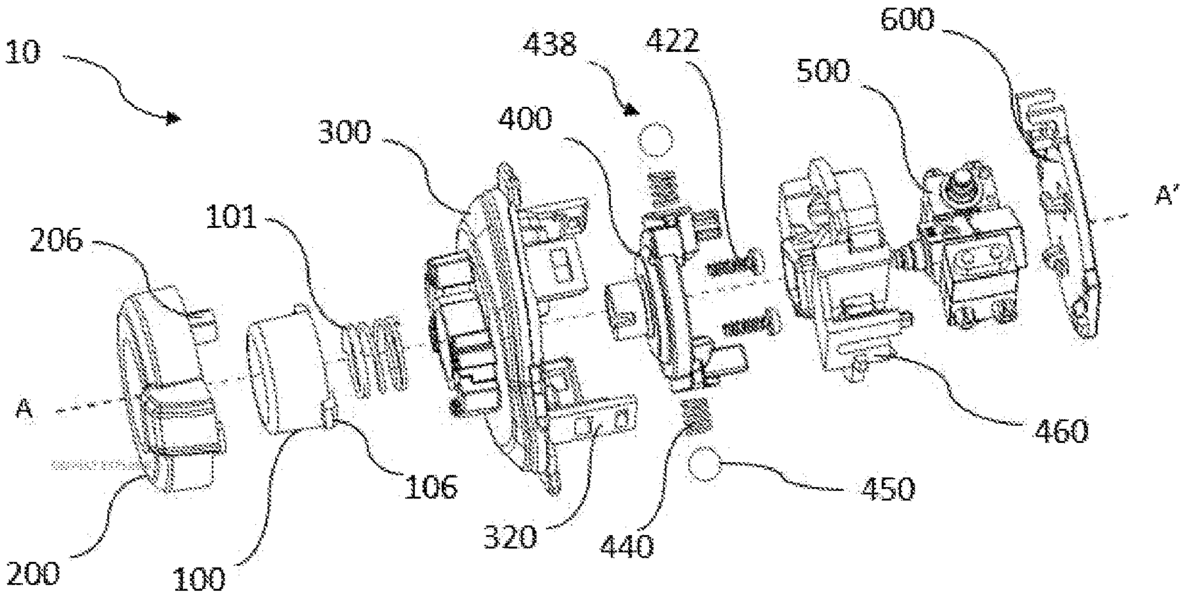
FIG. 2 illustrates an exploded view of the switch module of FIG. 1 and illustrates various different components of the switch module, in accordance with an embodiment of the present disclosure.

Referring to FIGS. 1, 1A and 2, the switch module (10) includes an engine start knob (100), an engine stop knob (200), a biasing member (101), a housing bracket (300), a switch carrier (400), compression springs (440), rolling balls (450), a switch carrier cover (460), a plurality of micro-switches (500), and a switch module cover (600), each of which are operably coupled with each other to form the switch module (10). The structural configuration of each of the components of the switch module (10) will be described in detail herein below.

In accordance with the present disclosure, referring to FIGS. 1A, 2, 3 and 4, the structural configuration of the housing bracket (300) of the switch module (10) is disclosed. As can be seen in FIGS. 1A, 2 to 4, the housing bracket (300) is a hollow "semi oblate spheroid" shaped structure, which forms a housing (12) of the switch module (10), essentially at least at the top part thereof. The housing bracket (300) is further adapted to provide a support structure to the other components of the switch module (10) and includes various integrated protruding tabs and stems and defines slots and grooves for snap-fitting or press-fitting the other components of the switch module (10).

Figure 3:
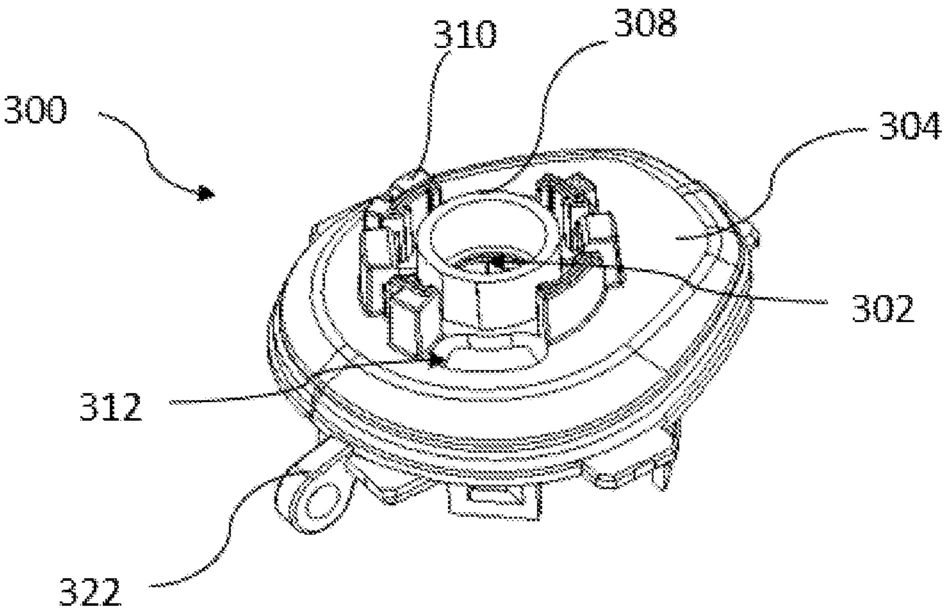
FIG. 3 illustrates a perspective view of a housing bracket of the switch module of FIG. 2, in accordance with an embodiment of the present disclosure.

As shown in FIG. 3, a circular hole (302) is defined in a central portion of the housing bracket (300). The circular hole (302) is defined to extend from a top surface (304) of the housing bracket (300) to a bottom surface (306) of the housing bracket (300) such that the circular hole (302) is a pass-through hole. The housing bracket (300) further includes a bracket stem (308) formed at a periphery of the circular hole (302) and extends from the top surface (304) of the housing bracket (300). In addition, the housing bracket (300) also includes a plurality of protruding tabs (310) formed at the top surface (304) and extends concentrically and parallel to the bracket stem (308) of the housing bracket (300). Within the scope of the present disclosure, the bracket stem (308) and the plurality of protruding tabs (310) are configured to facilitate engagement of the engine start knob (100) with the housing bracket (300). Further, the housing bracket (300) defines two diametrically opposite elliptical holes (312) extending from the top surface (304) to the bottom surface (306) of the housing bracket (300) disposed at a first end of the housing (12) of the switch module (10). Said two elliptical holes (312) are configured to facilitate engagement of the engine stop knob (200) with the switch carrier (400) of the switch module (10).

Figure 4:
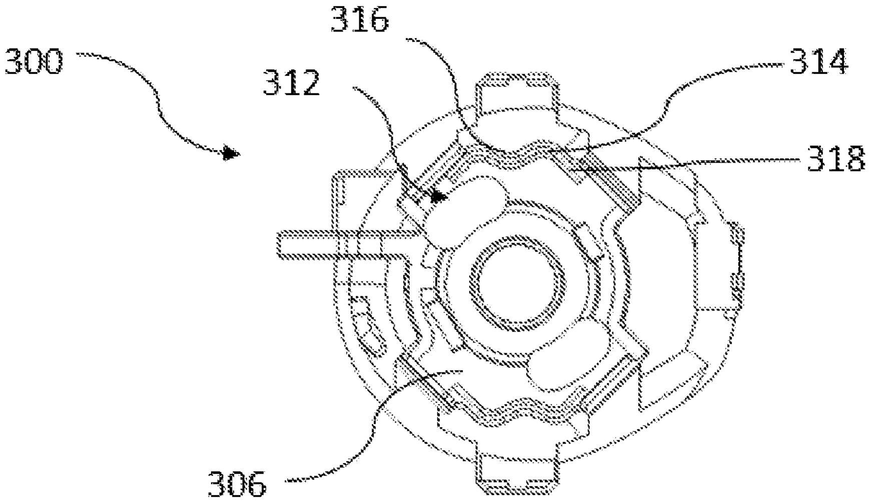
FIG. 4 illustrates a bottom view of the housing bracket of FIG. 3, in accordance with an embodiment of the present disclosure.

Further, as shown in FIG. 4, the housing bracket (300) defines a detent profile (314) formed at two diametrically opposite ends at the bottom surface (306) of the housing bracket (300). Each of the detent profiles (314), formed at the two ends, includes a "W-shaped" profile comprised of a semi-circular detent arc (316) and two linear detents (318) extending from each end of the detent arc (316). The functional configuration of the detent profiles (314) of the housing bracket (300) will be explained in the subsequent paragraphs. In an embodiment, the detent profiles (314) are defined in the housing bracket (300) at the two diametrically opposite ends of the housing bracket (300) that are proximal to the elliptical holes (312) for convenient operation of the switch module (10) and transfer of forces and/or torques from one component to the other component of the switch module (10) as explained below.

As shown in FIG. 2, the housing bracket (300) further includes abutment legs (320) extending from an outer periphery of the housing bracket (300) and away from the bottom surface (306) of the housing bracket (300). Each of the abutment legs (320) defines one or more slots therein for snap-fitting of the other components, for example, the switch carrier (400) and the switch module cover (600), with the housing bracket (300). In an embodiment, the housing bracket (300) further includes an attachment means (322), for example, a hook, as shown in FIG. 3, for mounting the switch module (10) to the casing unit and/or the handlebar of the vehicle. Within the scope of the present disclosure, the housing bracket (300), and the components thereof, may be made of any suitable lightweight and sturdy material, for example, polymer, resins, and the like. Also, the housing bracket (300) may be manufactured using any known technique, for example, casting, additive manufacturing, 3D printing, or the like.

Figure 5:
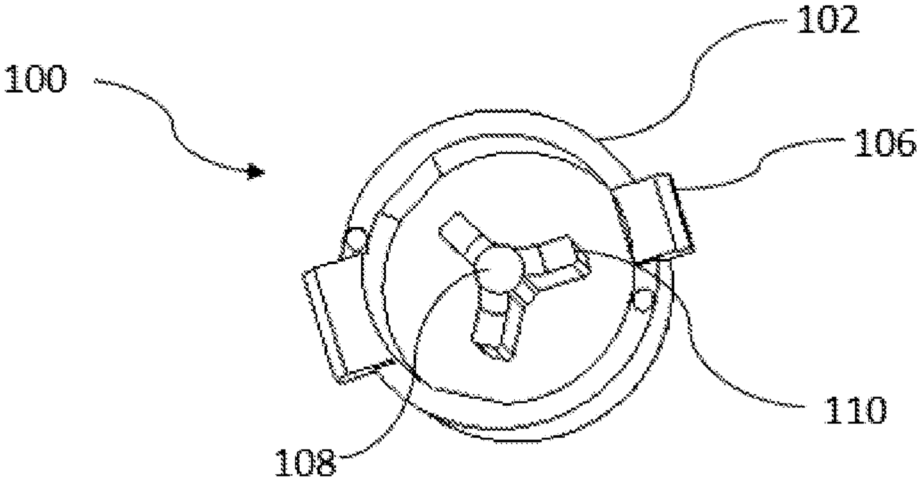
FIG. 5 illustrates a bottom perspective view of an engine start knob of the switch module of FIG. 2, in accordance with an embodiment of the present disclosure.

Referring to FIGS. 1A, 2 and 5, the engine start knob (100) of the switch module (10) is disclosed. The engine start knob (100) is adapted to be disposed at the first end of the housing (12) of the switch module (10). The engine start knob (100) is a hollow cylinder having an open bottom, i.e., the engine start knob (100) includes a cylindrical curved wall (102) and a top wall (104). In accordance with the present disclosure, a thickness of the curved wall (102) of the engine start knob (100) corresponds to a gap between the bracket stem (308) and the plurality of protruding tabs (310) of the housing bracket (300) such that curved wall (102) of the engine start knob (100) snap fits with the bracket stem (308) and the plurality of protruding tabs (310) of the housing bracket (300), as shown in FIG. 1A. Additionally, a couple of abutment means (106), for example, projections, may be formed at an open periphery of the curved wall (102) of the engine start knob (100), as shown in FIG. 2, for more conveniently fitting the engine start knob (100) with the housing bracket (300). In accordance with the present disclosure, the engine start knob (100) is a "push button" type knob which is manoeuvrable along a longitudinal axis A-A' of the switch module (10) for starting the engine operations. The manoeuvring of the engine start knob (100) along the longitudinal axis A-A' is facilitated by the biasing member (101), for example, a compression spring (101), that is positioned within the housing (12) of the switch module (10) and between the engine start knob (100) and the switch carrier (400) of the switch module (10), as shown in FIG. 1A. Within the scope of the present disclosure, the biasing member (101) is configured to bias the engine start knob (100) away from the switch carrier (400) and facilitate actuation of the engine start knob (100). To manoeuvre the engine start knob (100) for starting the engine operation, a push force is applied on the engine start knob (100), thereby pressing the engine start knob (100) towards the housing bracket (300) and compressing the compression spring (101). Once the compression spring (101) is compressed between the engine start knob (100) and the switch carrier (400), the compression spring (101) exerts an expansion force on the engine start knob (100) and pushes the engine start knob (100) back to a rest position of the engine start knob (100).

As shown in FIG. 1A, the engine start knob (100) includes a protrusion (108) extending from an inside surface of the top wall (104) to the open end of the engine start knob (100). The protrusion (108) further includes three ribs (110) extending radially from the protrusion (108) at the open end, thereby forming a "fan-shaped" structure, as shown in FIG. 5. The protrusion (108) and the three ribs (110) are configured to be received within the compression spring (101) in an assembled switch module (10). In an embodiment, the protrusion (108) and the ribs (110) are configured to move with the engine start knob (100) along the longitudinal axis A-A', on application of the push force on the engine start knob (100) and/or the expansion force of the compression spring (101) on the engine start knob (100). Within the scope of the present disclosure, the engine start knob (100), and the components thereof, may be made of any suitable lightweight and sturdy material, for example, polymer, resins, and the like. Also, the engine start knob (100), and the components thereof, may be manufactured using any known technique, for example casting, additive manufacturing, 3D printing, or the like.

Figure 6:
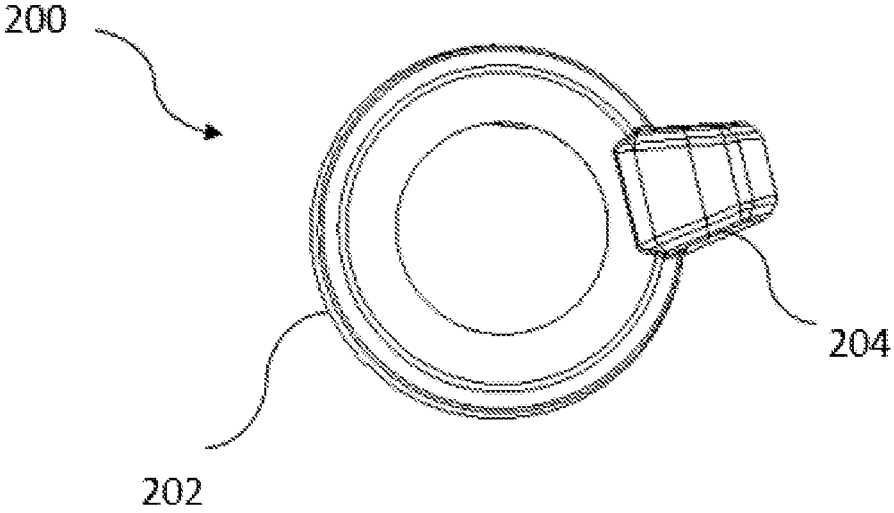
FIG. 6 illustrates a top view of an engine stop knob of the switch module of FIG. 2, in accordance with an embodiment of the present disclosure.
Figure 11:
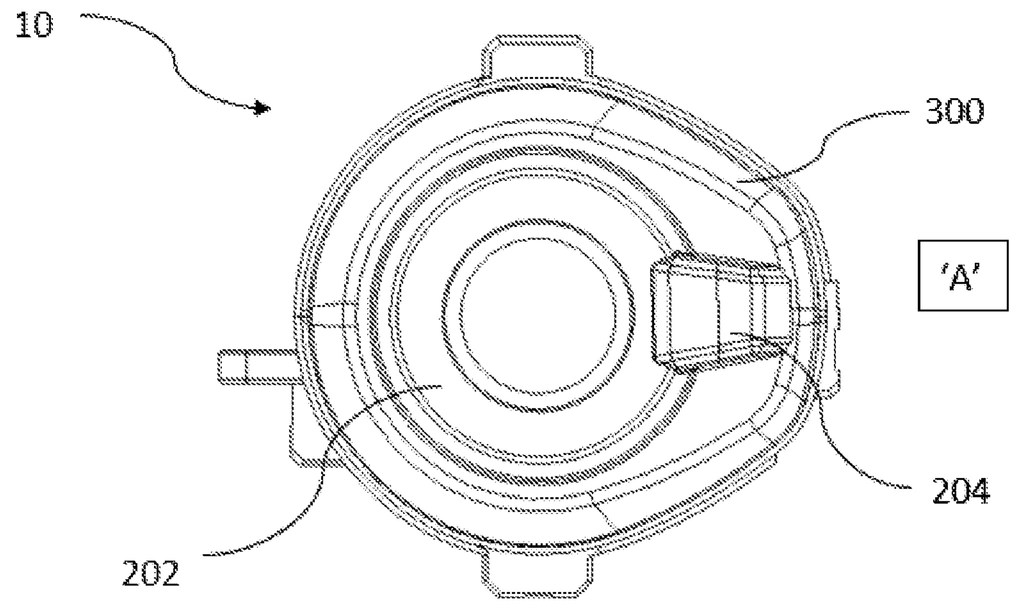
FIG. 11 illustrates a position of the engine stop knob corresponding to an active engine stop position of the engine stop knob of the switch module, in accordance with an embodiment of the present disclosure.
Figure 13:
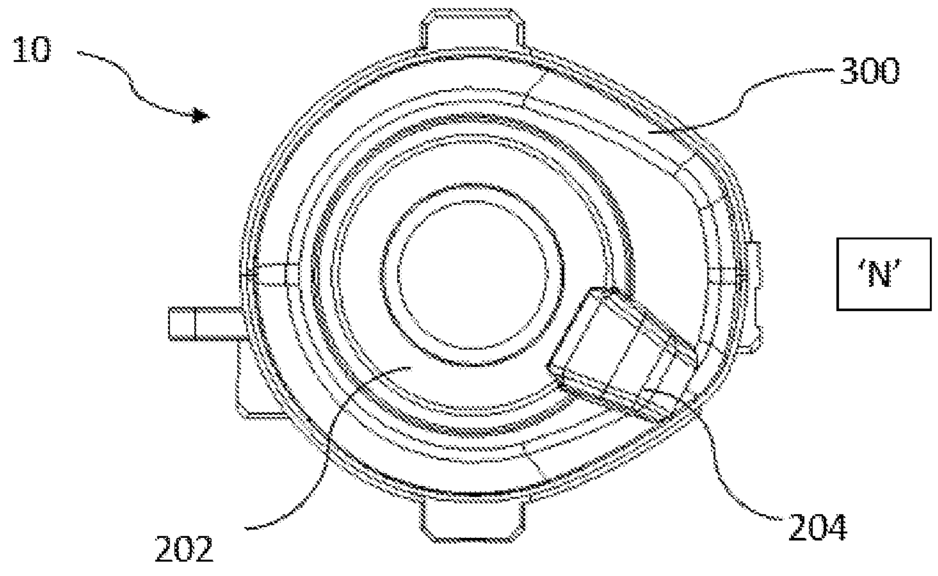
FIG. 13 illustrates a position of the engine stop knob corresponding to a neutral position of the engine stop knob of the switch module, in accordance with an embodiment of the present disclosure.

Referring to FIGS. 2 and 6, the engine stop knob (200) of the switch module (10) is disclosed. The engine stop knob (200) comprises an annular disc (202) adapted to be coupled with the housing bracket (300) of the switch module (10). The engine stop knob (200) is further adapted to be operably coupled to the switch carrier (400) to rotate the switch carrier (400) within the housing (12) of the switch module (10). The engine stop knob (200) is rotatable about the longitudinal axis A-A' between an active engine stop position 'A' and a neutral position 'N', as shown in FIGS. 11 and 13, respectively. In accordance with the present disclosure, the active engine stop position 'A' is referred to as a position of the engine stop knob (200) corresponding to which the engine operations of the vehicle are being stopped. Further, the neutral position 'N' is referred to as a position of the engine stop knob (200) corresponding to which the engine operations of the vehicle may be started. Within the scope of the disclosure, as shown in FIGS. 1 and 1A, the engine start knob (100) is adapted to be received with the annular disc (202) of the engine stop knob (200). It can accordingly be contemplated that the engine stop knob (200) is rotatably coupled with the housing bracket (300) and is adapted to be rotated about the longitudinal axis A-A', while the engine start knob (100) is adapted to be moved along the longitudinal axis A-A'.

In an embodiment, the engine stop knob (200) may include a ridge (204) integrally formed at the annular disc (202) or coupled with the annular disc (202) of the engine stop knob (200). The ridge (204) may be configured to facilitate an ease of manoeuvring of the engine stop knob (200) and/or indicating the active engine stop position 'A' and the neutral position 'N' of the engine stop knob (200), as shown in FIGS. 11 and 13.

The engine stop knob (200) further includes two legs (206), as shown in FIG. 2, extending from the annular disc (202) towards the housing bracket (300) along the longitudinal axis A-A'. The two legs (206) may be formed at diametrically opposite ends of the annular disc (202). In accordance with the present disclosure, the two legs (206) of the engine stop knob (200) are configured to pass through the two elliptical holes (312) of the housing bracket (300) such that in the assembled switch module (10), the legs (206) of the engine stop knob (200) are engaged/coupled with the switch carrier (400) of the switch module (10). Also, the legs (206) of the engine stop knob (200) and the elliptical holes (312) of the housing bracket (300) are so dimensioned to provide clearance around the legs (206) of the engine stop knob (200) such that the legs (206) can pivot/rotate between two positions within the elliptical holes (312) corresponding to the active engine stop position 'A' and the neutral position 'N' of the engine stop knob (200), and vice versa. In an embodiment, the engine stop knob (200) is disposed at the first end of the housing (12) and is operatively coupled to the switch carrier (400) to rotate the switch carrier (400) within the housing (12) of the switch module (10).

Within the scope of the present disclosure, the engine stop knob (200), and the components thereof, may be made of any suitable lightweight and sturdy material, for example, polymer, resins, and the like. Also, the engine stop knob (200), and the components thereof, may be manufactured using any known technique, for example casting, additive manufacturing, 3D printing, or the like.

Figure 7:
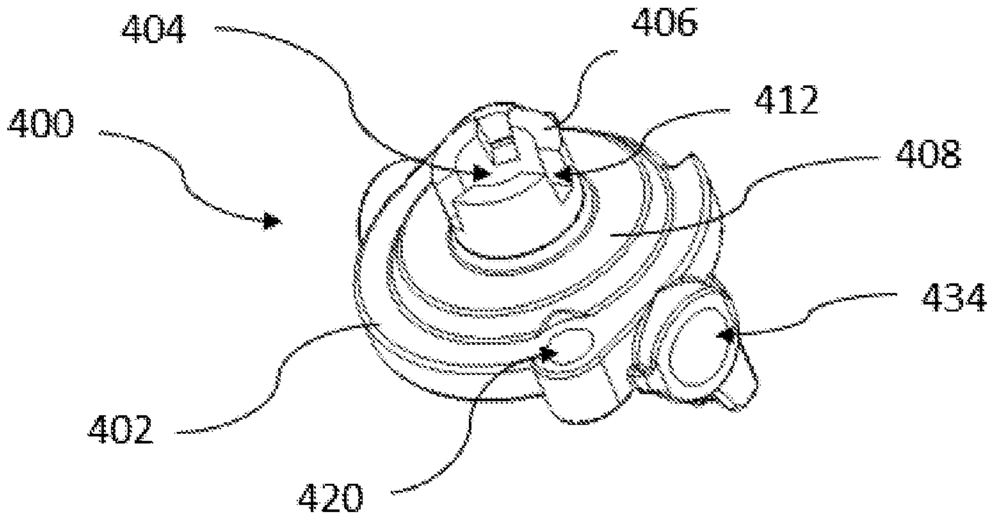
FIG. 7 illustrates a perspective view of a switch carrier of the switch module of FIG. 2, in accordance with an embodiment of the present disclosure.

Referring to FIGS. 1A, 2, 7 and 8, the switch carrier (400) of the switch module (10) is disclosed. The switch carrier (400) is a disc shaped plate (402) defining a pass-through hole (404) formed in a central portion of the plate (402). In an embodiment, the hole (404) of the plate (402) is co-axial with the circular hole (302) of the housing bracket (300). The switch carrier (400) further includes a carrier stem (406) (as shown in FIG. 7) formed at a periphery of the hole (404) and extends from a top side (408) of the switch carrier (400) along the longitudinal axis A-A' of the switch module (10). In accordance with the present disclosure, an outer diameter of the carrier stem (406) is less than an inner diameter of the bracket stem (308) such that during assembly of the switch carrier (400) with the housing bracket (300), the carrier stem (406) is disposed within the bracket stem (308), as shown in FIG. 1A. Within the scope of the present disclosure, the switch carrier (400) is adapted to be disposed within the housing (12) of the switch module (10). The carrier stem (406) defines three grooves (412) formed a length of the carrier stem (406). The grooves (412) are defined circumferentially at an equal distance from each other and extend along the longitudinal axis A-A', as shown in FIG. 7. In an embodiment of the present disclosure, the three grooves (412) may be formed of complimentary shape with the three ribs (110) of the engine start knob (100) and configured to receive the ribs (110) of the engine start knob (100) in the neutral position 'N' of the engine stop knob (200). In an embodiment, the ribs (110) of the engine start knob (100) are offset from the grooves (412) of the switch carrier (400) in the active engine stop position 'A' of the engine stop knob (200).

Figure 8:
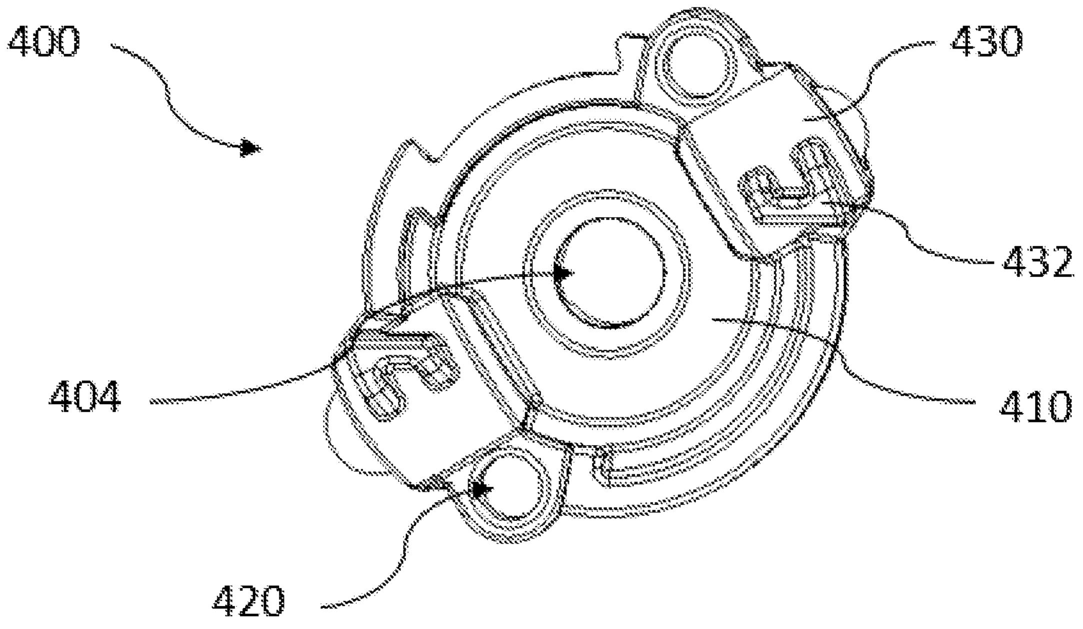
FIG. 8 illustrates a bottom view of the switch carrier of FIG. 7, in accordance with an embodiment of the present disclosure.

The switch carrier (400) further includes mounting holes (420), as shown in FIGS. 7 and 8, adaptive to receive fasteners (422), such as, screws (shown in FIG. 2), for fastening the switch carrier (400) with the engine stop knob (200). For fastening/coupling the switch carrier (400) and the engine stop knob (200), the mounting holes (420) of the switch carrier (400) are aligned with the legs (206) of the engine stop knob (200) to receive the legs (206) of the engine stop knob (200) therein, after passing the legs (206) through the elliptical holes (312) of the housing bracket (300), and the fasteners (422) are passed through the mounting holes (420) and the legs (206) of the engine stop knob (200). Further, the legs (206) of the engine stop knob (200) is configured to rotate the switch carrier (400) along with a rotational movement of the engine stop knob (200) between the neutral position 'N' and the active engine stop position 'A' of the engine stop knob (200).

Figure 12:
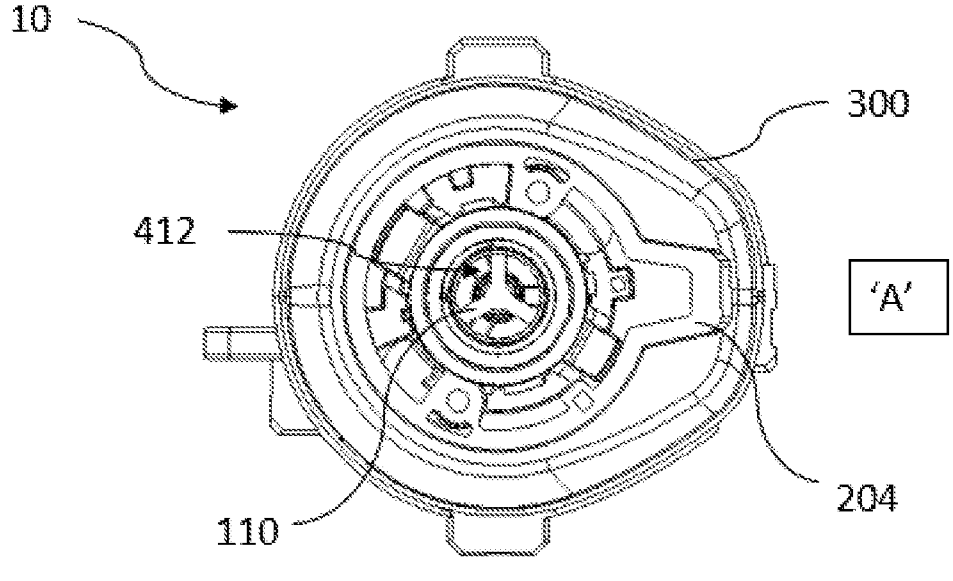
FIG. 12 illustrates a top view of the switch module in the active engine stop position, without a top wall of the engine start knob, in accordance with an embodiment of the present disclosure.
Figure 14:
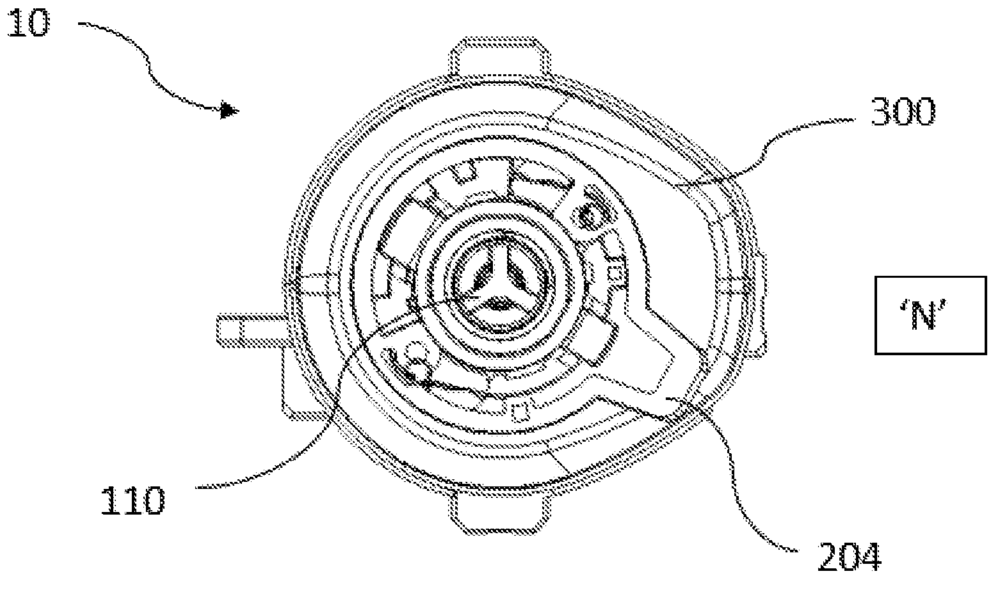
FIG. 14 illustrates a top view of the switch module in the neutral position, without the top wall of the engine start knob, in accordance with an embodiment of the present disclosure.

Once the switch carrier (400) is coupled with the engine stop knob (200), a rotation of the engine stop knob (200) relative to the housing bracket (300) causes the switch carrier (400) to rotate relative to the housing bracket (300) within the housing (12) of the switch module (10). The rotation of the engine stop knob (200) and the switch carrier (400) therefore causes the carrier stem (406) to rotate about the longitudinal axis A-A' corresponding to the active engine stop position 'A' and the neutral position 'N' of the engine stop knob (200). In accordance with the present disclosure, when the engine stop knob (200) rests in the active engine stop position 'A', the grooves (412) of the carrier stem (406) are offset from the ribs (110) of the engine start knob (100), as shown in FIG. 12. Accordingly, in said position, the ribs (110) of the engine start knob (100) cannot be received within the grooves (412) of the carrier stem (406), even if a push force is applied on the engine start knob (100), thereby preventing the starting of the engine operations in the active engine stop position 'A' of the engine stop knob (200). Also, in accordance with the present disclosure, when the engine stop knob (200) rests in the neutral position, the grooves (412) of the carrier stem (406) are aligned with the ribs (110) of the engine start knob (100), as shown in FIG. 14. Accordingly, in said position, the ribs (110) of the engine start knob (100) may be received within the grooves (412) of the carrier stem (406) for pressing and actuating the associated microswitches(s), when a push force is applied on the engine start knob (100), thereby allowing starting of the engine operations in the neutral position 'N' of the engine stop knob (200).

Referring to FIG. 8, the switch carrier (400) includes two shoulders (430) formed at two diametrically opposite ends at a bottom side (410) of the switch carrier (400). Each of the shoulders (430) includes an actuating clip (432) formed on a surface thereof, as shown in FIG. 8. It can be contemplated that a rotation of the plate (402) of the switch carrier (400) relative to the housing bracket (300) results in corresponding rotation of the shoulders (430) and the actuating clips (432) relative to the housing bracket (300).

Figure 9:
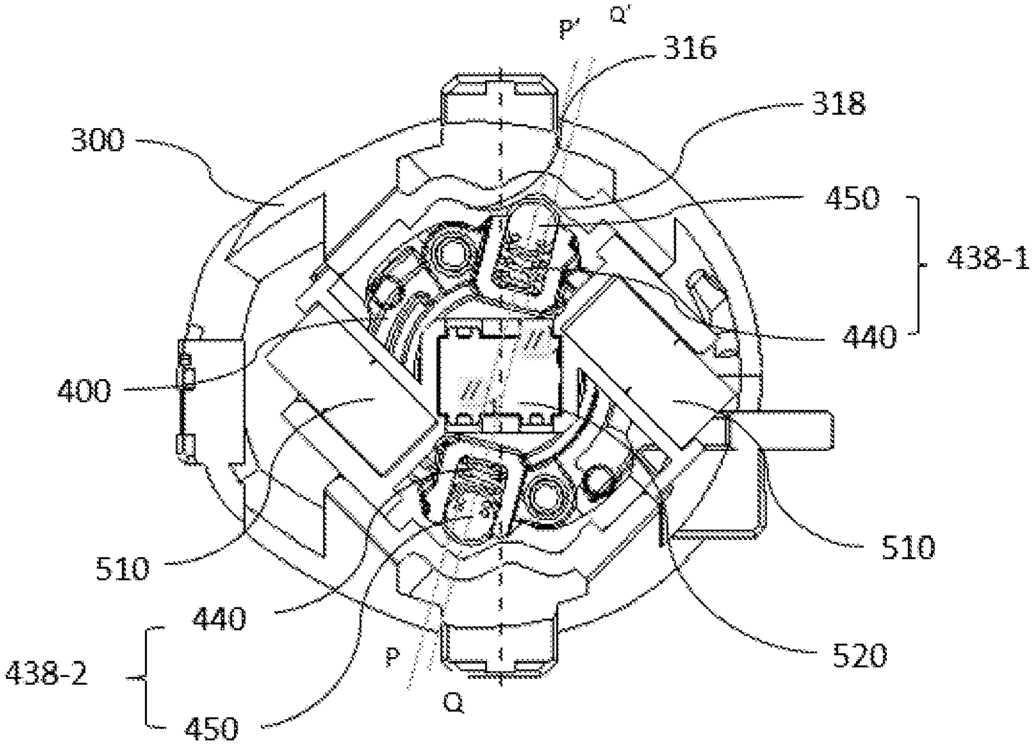
FIG. 9 illustrates a bottom view of the switch module of FIG. 1, without a module cover of the switch module, in accordance with an embodiment of the present disclosure.

For facilitating rotation of the switch carrier (400) relative to the housing bracket (300), the switch module (10) comprises at least one rolling unit (438) disposed between the switch carrier (400) and the housing bracket (300). In accordance with the present disclosure, each of the at least one rolling unit (438) is configured to roll and/or slide over a corresponding detent profile (314) of the housing bracket (300) to facilitate rotation of the switch carrier (400) along with the rotational movement of the engine stop knob (200) between the neutral position 'N' and the active engine stop position 'A'. In an embodiment, each of the at least one rolling unit (438) comprises a rolling ball (450) and a compression spring (440). The rolling ball (450) is adapted to be disposed within a hole (434) defined in a circumferential side of the switch carrier (400). Further, the compression spring (440) is adapted to be disposed within the hole (434) of the switch carrier (400) and configured to bias the rolling ball (450) against the detent profile (314) of the housing bracket (300), as shown in FIG. 9. Referring to FIG. 9, the rolling balls (450) are operatively and slidably coupled with the detent profile (314) of the housing bracket (300). In accordance with the present disclosure, when the engine stop knob (200) and correspondingly the switch carrier (400) is rotated from the active engine stop position 'A' to the neutral position 'N' of the engine stop knob (200), or vice versa, the rolling balls (450) slide over the detent arc (316) and rest in the spaces between the detent arc (316) and the linear detents (318) corresponding to the active engine stop position 'A' and the neutral position 'N' of the engine stop knob (200). The rolling balls (450) slide over the detent arc (316) against the compression force exerted by the compression springs (440) on the rolling balls (450). It can be contemplated that the sliding of the rolling balls (450) over and along the detent profile (314) of the housing bracket (300) allows rotation of the engine stop knob (200) and the switch carrier (400) (and the shoulders (430)) relative to the housing bracket (300). Also, resting of the rolling balls (450)

in the space between the detent arc (316) and the linear detents (318) allows the engine stop knob (200) to be held in the active engine stop position 'A' and the neutral position 'N' of the engine stop knob (200).

In accordance with the present disclosure, again referring to FIG. 9, the switch module comprises a first rolling unit (438-1) and a second rolling unit (438-2) disposed diametrically opposite to the first rolling unit (438-1). In an embodiment, an axis P-P' of the rolling ball (440) and the compression spring (450) of the first rolling unit (438-1) is offset from an axis Q-Q' of the rolling ball (440) and the compression spring (450) of the second rolling unit (438-2). Further, in an embodiment, the axis P-P' of the first rolling unit (438-1) and the axis Q-Q' of the second rolling unit (438-2) are offset from the longitudinal axis A-A' of the switch module (10). In accordance with the present disclosure, said configuration does not cancel out the equal and opposite forces exerted by the compression springs (440), rather generates a torque in a rotational direction, thereby facilitating smooth and convenient sliding of the rolling balls (450) along the detent profile (314) of the housing bracket (300) and therefore, provides ease of operation of the engine stop knob (200). Also, said configuration ensures to avoid the rolling balls (450) being stuck in the detent profile (314), and accordingly, to avoid the engine start knob (100) and/or the engine stop knob (200) being stuck with the switch carrier (400) between the active engine stop position 'A' and the neutral position 'N' of the engine stop knob (200). In an embodiment, the axis P-P' of the first rolling unit (438-1) and the axis Q-Q' of the second rolling unit (438-2) are aligned orthogonally to the longitudinal axis A-A' of the switch module (10). In an exemplary embodiment, each of the axis P-P' of the first rolling unit (438-1) and the axis Q-Q' of the second rolling unit (438-2) is spaced apart from the longitudinal axis A-A' of the switch module (10) by 0.5 mm, i.e., the axis P-P' of the first rolling unit (438-1) is spaced apart from the axis Q-Q' of the second rolling unit (438-2) by a distance of 1.0 mm.

The switch module (10) further includes a switch carrier cover (460), as shown in FIG. 2, adapted to be snap-fitted on the housing bracket (300) such that the switch carrier (400), the pair of compression springs (440) and the pair of rolling balls (450) are secured between the housing bracket (300) and the switch carrier cover (460). In accordance with the present disclosure, the switch carrier cover (460) includes a geometry complementary to the geometry of the bottom side (410) of the switch carrier (400) on one side, and the plurality of microswitches (500) disposed on the other side. Within the scope of the present disclosure, the switch carrier (400) and the switch carrier cover (460), may be made of any suitable lightweight and sturdy material, for example, polymer, resins, and the like. Also, the switch carrier (400) and the switch carrier cover (460) may be manufactured using any known technique, for example casting, additive manufacturing, 3D printing, or the like.

Figure 15:
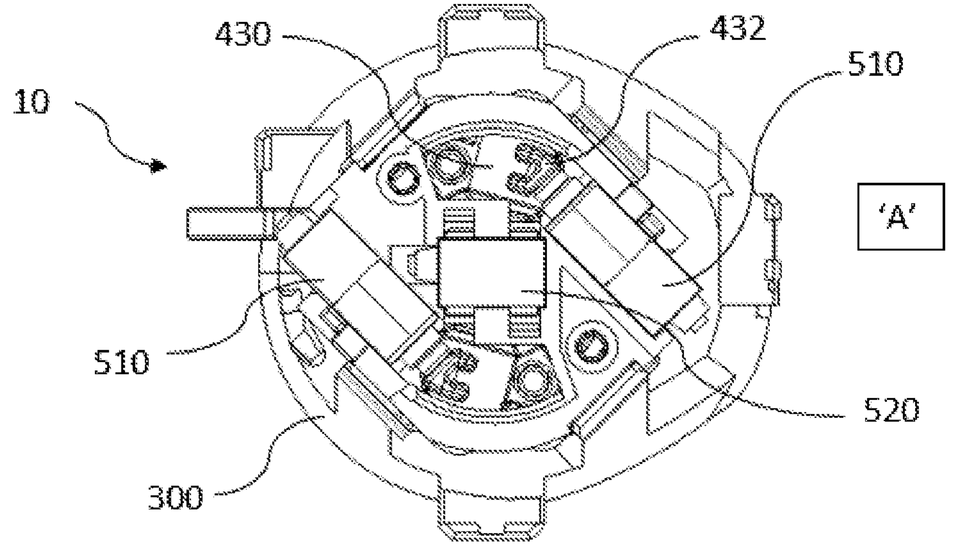
FIG. 15 illustrates a bottom view of the switch module in the active engine stop position, without the module cover of the switch module, in accordance with an embodiment of the present disclosure.
Figure 16:
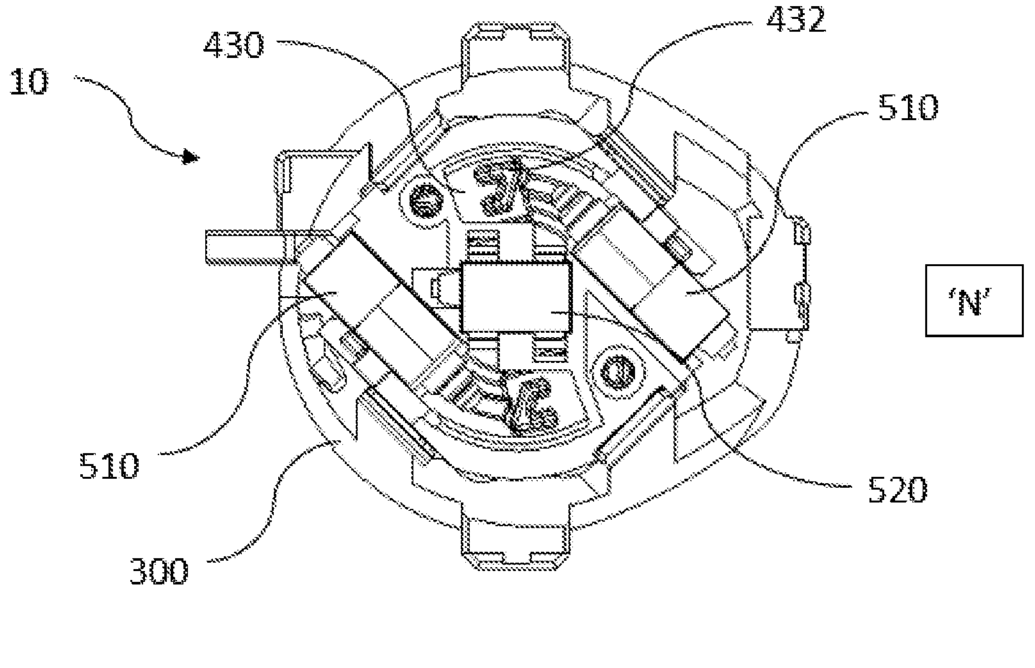
FIG. 16 illustrates a bottom view of the switch module in the neutral position, without the module cover of the switch module, in accordance with an embodiment of the present disclosure.

Referring to FIG. 2, the switch module (10) includes the plurality of microswitches (500) that are adapted to be received in the complimentary geometry of the switch carrier (400) and the switch carrier cover (460). The microswitches (500) used in the switch module (10) of the present disclosure are adapted to operate on low ampere current, and accordingly the switch module (10) of the present disclosure operates on low ampere current. Within the scope of the present disclosure, the plurality of microswitches (500) of the switch module (10) includes first microswitches (510) and a second microswitch (520). The first microswitches (510) are positioned in a direction perpendicular to the longitudinal axis A-A' of the switch module (10), as shown in FIGS. 2, 15 and 16. Further, the second microswitch (520) is arranged along the longitudinal axis A-A' of the switch module (10), as shown in FIGS. 2, 15 and 16. The first microswitches (510) arranged perpendicular to the longitudinal axis A-A' are positioned such that an operative end of each the first microswitch (510) faces the shoulder (430) and the actuating clips (432) of the switch carrier (400), and the first microswitches (510) are actuatable by the actuating clips (432) upon rotation of the engine stop knob (200) (and the switch carrier (400)) from the neutral position 'N' to the active engine stop position 'A' of the engine stop knob (200). Further, the second microswitch (520) arranged along the longitudinal axis A-A' is positioned such that an operative end of the second microswitch (520) faces the protrusion (108) of the engine start knob (100), and the second microswitch (520) is actuatable by the protrusion (108) of the engine start knob (100) when the engine start knob (100) is pressed along the longitudinal axis A-A'.

The first microswitches (510) and the second microswitch (520) are electrically coupled with an engine control unit (ECU) of the vehicle and are adaptive to transmit signals to the engine control unit upon actuation of the first microswitches (510) by the actuating clips (432) of the switch carrier (400) and/or of the second microswitch (520) by the protrusion (108) of the engine start knob (100). The engine control unit is configured to open or close an electric current circuit of the engine to prevent or allow transmission of current from a battery/power source (not shown) to the engine for stopping and/or starting the engine operations. In accordance with the present disclosure, the actuation of the microswitches (510, 520) is entirely dependent on the rotation of the engine stop knob (200) and/or push force exerted on the engine start knob (100).

Within the scope of the present disclosure, when the engine stop knob (200) is rotated from the active engine stop position 'A' to the neutral position 'N', the engine stop knob (200) rotates the switch carrier (400) to disengage from the first microswitches (510) to facilitate closing an electric current circuit for allowing a transmission of current from a power source to the engine of the vehicle. Further, when the engine stop knob (200) is rotated from the neutral position 'N' to the active engine stop position 'A', the engine stop knob (200) rotates the switch carrier (400) to engage with the first microswitches (510) to facilitate opening the electric current circuit for preventing the transmission of current from the power source to the engine of the vehicle. Furthermore, the engine start knob (100) is actuatable to engage with the second microswitch (520) in the neutral position 'N' of the engine stop knob (200) to start power generation process of the engine of the vehicle.

During the normal operation of the vehicle or during the engine run state, the engine stop knob (200) is in the neutral position 'N', and the actuating clips (432) of the switch carrier (400) are disengaged from the operative ends of the first microswitches (510). When it is desired to stop the engine operations, the engine stop knob (200) is rotated from the neutral position 'N' to the active engine stop position 'A' as a result of which the shoulders (430) of the switch carrier (400) correspondingly rotate towards the respective first microswitch (510). Said rotation of the shoulders (430) causes the actuating clips (432) to press against the operative ends of the first microswitches (510), as shown in FIG. 15, thereby actuating the first microswitches (510). Corresponding to the actuation of the first microswitches (510), signals, from each of the first microswitches (510), are transmitted to the engine control unit to open the electric current circuit for preventing transmission of current from the battery to the engine for stopping the engine operations.

Further, when the engine stop knob (200) is rotated from the active engine stop position 'A' to the neutral position 'N', the actuating clips (432) of the switch carrier (400) disengage from the operative ends of the first microswitches (510), as shown in FIG. 16. Corresponding to said disengagement, signals, from each of the first microswitches (510), are transmitted to the engine control unit to close the electric current circuit for allowing transmission of current from the battery to the engine for starting the engine operations.

It is pertinent to note that merely rotating the engine stop knob (200) from the active engine stop position 'A' to the neutral position 'N' does not start the engine operations, rather only allows transmission of current from the battery to the engine for starting of the engine operations. To start the engine operations, the engine start knob (100) is required to the pushed along the longitudinal axis A-A' of the switch module (10) as a result of which the ribs (110) of the engine start knob (100) are received within the grooves (412) of the switch carrier (400) causing the protrusion (108) of the engine start knob (100) to actuate the second microswitch (520). Due to said actuation of the second microswitch (520), the second microswitch (520) transmits a signal to the engine control unit for starting the engine operations.

Within the scope of the present disclosure, when the engine stop knob (200) is rotated from the active engine stop position 'A' to the neutral position 'N', or vice versa, signals from both first microswitches (510), i.e., two signals, arc transmitted to the engine control unit. These two redundant signals for single switch operation ensure reliability of the switch module (10) to manage the critical nature of the switch module (10).

Figure 10:
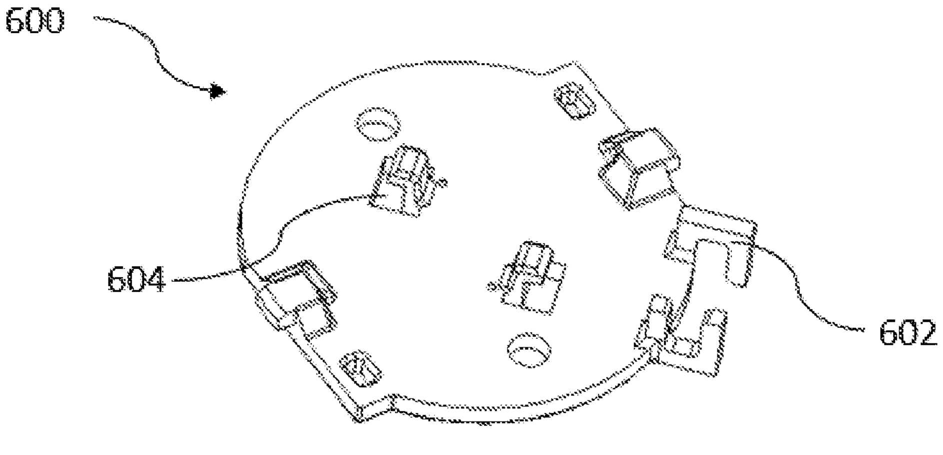
FIG. 10 illustrates a perspective view of the module cover of the switch module of FIG. 2, in accordance with an embodiment of the present disclosure.

Referring to FIGS. 1A, 2 and 10, the switch module (10) includes the switch module cover (600). The switch module cover (600) is adapted to be snap fitted with the housing bracket (300) by means of attachment clips (602). Alternatively, the switch module cover (600) may be fastened to the housing bracket (300) by means of fasteners, such as screws. The switch module cover (600) forms a part of the housing (12) of the switch module (10) and secures the components of the switch module (10), for example the microswitches (500) and the switch carrier (400), within the switch module (10). In an embodiment, the switch module cover (600) includes support structures (604), as shown in FIG. 10, for supporting the plurality of microswitches (500) on the switch module cover (600). Within the scope of the present disclosure, the switch module cover (600) may be made of any suitable lightweight and sturdy material, for example, polymer, resins, and the like. Also, the switch module cover (600) may be manufactured using any known technique, for example casting, additive manufacturing, 3D printing, or the like.

In accordance with the present disclosure, an assembly sequence of the components of the switch module (10) will be described hereinafter.

To assemble the switch module (10), the engine start knob (100) is snap fitted onto the housing bracket (300) by inserting the curved wall (102) of the engine start knob (100) between the bracket stem (308) and the plurality of protruding tabs (310). While snap fitting the engine start knob (100) onto the housing bracket (300), the compression spring (101) is also held, and subsequently fitted, within the engine start knob (100) and the housing bracket (300). Next, the engine stop knob (200) is mounted onto the housing bracket (300) such that the engine start knob (100) is disposed within the annular disc (202) and the legs (206) of the engine stop knob (200) pass through the elliptical holes (312) of the housing bracket (300).

Thereafter, the compression springs (440) and the rolling balls (450) are mounted within the holes (434) formed in the circumferential side of the switch carrier (400). Said assembly of the switch carrier (400), including the compression springs (440) and the rolling balls (450), is then mounted on the housing bracket (300) such that the legs (206) of the engine stop knob (200) align with the mounting holes (420) of the switch carrier (400). The fasteners (422) are then passed through the mounting holes (420) of the switch carrier (400) and the legs (206) of the engine stop knob (200) to fasten the switch carrier (400) with the engine stop knob (200). Next, the switch carrier cover (460) is snap fitted with the housing bracket (300) for securing the switch carrier (400), the pair of compression springs (440) and the pair of rolling balls (450) between the housing bracket (300) and the switch carrier cover (460).

The plurality of microswitches (500) are then positioned in the complimentary geometry of the switch carrier cover (460), and the switch module cover (600) is snap fitted with or fastened to the housing bracket (300) to secure the microswitches (500) within the switch module (10).

In accordance with the present disclosure, the engine start knob (100) and the engine stop knob (200) are two separate components of the switch module (10), and therefore, a rotation of the engine stop knob (200) facilitates only setting the engine stop knob (200) from an active engine stop position 'A' to a neutral position 'N'. Accordingly, an angular displacement of the engine stop knob (200) of the switch module (10) of the present disclosure is less than an angular displacement of the rotary engine stop knob of the conventional switch modules. Also, since the engine stop knob (200) of the switch module (10) of the present disclosure is manoeuvrable in a rotational manner, while the engine start knob (100) is manoeuvrable in a push manner, chances of accidently and inattentively starting the engine operations are largely reduced as compared to the conventional switch modules. Therefore, the switch module (10) of the present disclosure adds to the safety of the driver and/or the passenger.

Further, since the switch module (10) of the present disclosure employs separate engine stop knob (200) and engine start knob (100), each of which is operably coupled to their respective low ampere microswitches, the operations of stopping and starting the engine are performed at low ampere current. Further, the switch module (10) of the present disclosure provides hassle free operation by the driver to start and/or stop the engine operations of the vehicle. The switch module (10) also reduces the manufacturing cost and increases aesthetic appeal of the vehicle.

The various embodiments of the present disclosure have been described above with reference to the accompanying drawings. The present disclosure is not limited to the illustrated embodiments; rather, these embodiments are intended to fully and completely disclose the subject matter of the disclosure to those skilled in this art. In the drawings, like numbers refer to like elements throughout. Thicknesses and dimensions of some components may be exaggerated for clarity.

Herein, the terms "attached", "connected", "interconnected", "contacting", "mounted", "coupled" and the like can mean either direct or indirect attachment or contact between elements, unless stated otherwise.

Well-known functions or constructions may not be described in detail for brevity and/or clarity. As used herein the expression “and/or” includes any and all combinations of one or more of the associated listed items.

The terminology used herein is for the purpose of describing particular embodiments only and is not intended to be limiting of the disclosure. As used herein, the singular forms “a”, “an” and “the” are intended to include the plural forms as well, unless the context clearly indicates otherwise. It will be further understood that the terms “comprises”, “comprising”, “includes” and/or “including” when used in this specification, specify the presence of stated features, operations, elements, and/or components, but do not preclude the presence or addition of one or more other features, operations, elements, components, and/or groups thereof.

While considerable emphasis has been placed herein on the particular features of this disclosure, it will be appreciated that various modifications can be made, and that many changes can be made in the preferred embodiments without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

EQUIVALENTS

The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Any discussion of documents, acts, materials, devices, articles and the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

LIST OF REFERENCE NUMERALS

| PARTICULARS | REFERENCE NUMERAL |
|---|---|
| Switch Module | 10 |
| Housing | 12 |
| Engine start knob | 100 |
| Biasing member | 101 |
| Curved wall | 102 |
| Top wall | 104 |
| Abutment means | 106 |
| Protrusion | 108 |
| Ribs | 110 |
| Engine stop knob | 200 |
| Annular disc | 202 |
| Ridge | 204 |
| Legs | 206 |
| Housing bracket | 300 |
| Circular hole | 302 |
| Top surface | 304 |
| Bottom surface | 306 |
| Bracket stem | 308 |
| Plurality of protruding tabs | 310 |
| Elliptical holes | 312 |
| Detent profile | 314 |
| Detent arc | 316 |
| Linear detents | 318 |
| Abutment legs | 320 |
| Attachment means | 322 |
| Switch carrier | 400 |
| Plate | 402 |
| Hole | 404 |
| Carrier stem | 406 |
| Top side | 408 |
| Bottom side | 410 |
| Grooves | 412 |
| Mounting holes | 420 |
| Fasteners | 422 |
| Shoulders | 430 |
| Actuating clip | 432 |
| Holes | 434 |
| Rolling unit | 438 |
| First rolling unit | 438-1 |
| Second rolling unit | 438-2 |
| Compression springs | 440 |
| Rolling balls | 450 |
| Switch Carrier cover | 460 |
| Plurality of microswitches | 500 |
| First microswitches | 510 |
| Second microswitch | 520 |
| Switch module cover | 600 |
| Attachment clips | 602 |
| Support structures | 604 |
| Longitudinal axis | A-A' |
| Active engine stop position | A |
| Neutral position | N |

The invention claimed is:

1. A switch module for controlling operations of an engine of a vehicle, the switch module comprising:
- a switch carrier disposed within a housing of the switch module, the switch carrier adapted to rotate within the housing, the switch carrier defining grooves formed along a length of a carrier stem;
- a plurality of microswitches disposed within the housing, the plurality of microswitches comprising first microswitches and a second microswitch;
- an engine stop knob disposed at a first end of the housing and operatively coupled to the switch carrier to rotate the switch carrier within the housing, wherein the engine stop knob is configured to be rotated between a neutral position and an active engine stop position, in which
  - when the engine stop knob is rotated from the active engine stop position to the neutral position, the engine stop knob rotates the switch carrier to disengage from the first microswitches to facilitate closing an electric current circuit for allowing a transmission of current from a power source to the engine of the vehicle, and when the engine stop knob is rotated from the neutral position to the active engine stop position, the engine stop knob rotates the switch carrier to engage with the first microswitches to facilitate opening the electric current circuit for preventing the transmission of current from the power source to the engine of the vehicle; and an engine start knob disposed at the first end of the housing and operatively coupled with the second microswitch, and actuatable to engage with the second microswitch in the neutral position of the engine stop knob;

wherein the engine start knob includes:

a hollow cylinder having a curved wall and a top wall; and a protrusion extending from the top wall, the protrusion having ribs extending radially therefrom, wherein the ribs of the engine start knob are adapted to be received in the grooves of the switch carrier to engage the engine start knob with the second microswitch in the neutral position of the engine stop knob to start power generation process of the engine, and the ribs of the engine start knob are offset from the grooves of the switch carrier in the active engine stop position.

2. The switch module as claimed in claim 1, wherein the switch module comprises a biasing member disposed between the engine start knob and the switch carrier, wherein the biasing member is configured to bias the engine start knob away from the switch carrier and facilitate actuation of the engine start knob.

3. The switch module as claimed in claim 1, wherein the carrier stem is formed at a periphery of a hole defined in a plate of the switch carrier.

4. The switch module as claimed in claim 1, wherein the engine stop knob comprises legs extending from a body of the engine stop knob;

the switch carrier defines mounting holes in a plate of the switch carrier; and the legs of the engine stop knob are configured to be received in the mounting holes of the switch carrier to facilitate coupling of the engine stop knob with the switch carrier and rotating the switch carrier along with a rotational movement of the engine stop knob between the neutral position and the active engine stop position.

5. The switch module as claimed in claim 4, wherein the housing defines elliptical holes in a housing bracket disposed at the first end of the housing, the elliptical holes configured to receive the legs of the engine stop knob to facilitate coupling of the engine stop knob with the switch carrier; and the elliptical holes are adapted to provide clearance around the legs of the engine stop knob to rotate between the neutral position and the active engine stop position.

6. The switch module as claimed in claim 1, wherein the switch module comprises:

at least one rolling unit disposed between the switch carrier and a housing bracket of the housing, wherein each of the at least one rolling unit is configured to roll and/or slide over a corresponding detent profile defined on a surface of the housing bracket to facilitate rotation of the switch carrier along with a rotational movement of the engine stop knob between the neutral position and the active engine stop position.

7. The switch module as claimed in claim 6, wherein each of the at least one rolling unit comprises:

a rolling ball disposed within a hole defined in a circumferential side of the switch carrier; and a compression spring disposed within the hole of the switch carrier and configured to bias the rolling ball against the detent profile of the housing bracket.

8. The switch module as claimed in claim 7, wherein the switch module comprises a first rolling unit and a second rolling unit, and an axis of the rolling ball and the compression spring of the first rolling unit is offset from an axis of the rolling ball and the compression spring of the second rolling unit.

9. The switch module as claimed in claim 8, wherein the axis of the first rolling unit and the axis of the second rolling unit are offset from a longitudinal axis of the switch module.

10. The switch module as claimed in claim 8, wherein each of the axis of the first rolling unit and the axis of the second rolling unit is spaced apart from a longitudinal axis of the switch module by 0.5 mm.

11. The switch module as claimed in claim 6, wherein the detent profile of the housing bracket is comprised of a semi-circular detent arc and two linear detents extending from each end of the semi-circular detent arc.

12. The switch module as claimed in claim 1, wherein the switch carrier comprises actuating clips formed on an abutment shoulder of the switch carrier, and the abutment shoulder and the actuating clips are adapted to rotate with the switch carrier to engage or disengage the switch carrier from the first microswitches.

13. The switch module as claimed in claim 1, wherein the housing comprises a housing bracket disposed at the first end of the housing, and the housing bracket includes a bracket stem and a plurality of tabs extending from a surface of the housing bracket for mounting the engine start knob and the engine stop knob on the housing.

14. The switch module as claimed in claim 1, wherein the engine stop knob is comprised of an annular disc coupled with the housing and operatively coupled to the switch carrier to rotate the switch carrier within the housing; and the engine start knob is a push-button disposed within a central hole of the annular disc of the engine stop knob and actuatable to engage with the second microswitch in the neutral position of the engine stop knob to start power generation process of the engine.

15. The switch module as claimed in claim 1, wherein the plurality of microswitches is electrically coupled with an engine control unit of the vehicle and is configured to transmit signals to the engine control unit upon actuation of the microswitches.

16. A vehicle, comprising:

a vehicle frame;

a front wheel and a rear wheel;

an engine unit and a transmission unit;

a steering assembly operatively coupled with the front wheel; and a switch module as claimed in claim 1, the switch module adapted to be coupled with a handlebar of the steering assembly and configured to control operations of the engine unit of the vehicle.

* * * * *